United States Patent
Haenle

(10) Patent No.: US 8,360,695 B2
(45) Date of Patent: Jan. 29, 2013

(54) INTERFACE BETWEEN A ROTATING SHANK TOOL AND A LUBRICANT TRANSFER AREA IN A TOOL HOLDER

(75) Inventor: Peter Haenle, Wales, WI (US)

(73) Assignee: Guehring OHG, Albstadt (DE)

( * ) Notice: Subject to any disclaimer, the term of this patent is extended or adjusted under 35 U.S.C. 154(b) by 988 days.

(21) Appl. No.: 12/332,599

(22) Filed: Dec. 11, 2008

(65) Prior Publication Data

US 2010/0148454 A1    Jun. 17, 2010

(51) Int. Cl.
*B23B 51/06* (2006.01)

(52) U.S. Cl. ............................................ 408/57; 279/20

(58) Field of Classification Search ............ 408/56, 408/57, 59; 279/20
See application file for complete search history.

(56) References Cited

U.S. PATENT DOCUMENTS

| | | | |
|---|---|---|---|
| 3,313,186 A * | 4/1967 | Rochon ........................ 76/108.1 |
| 5,649,714 A * | 7/1997 | Uchida et al. .................... 279/20 |
| 7,156,589 B2 * | 1/2007 | Sugata et al. ................ 409/136 |
| 7,160,067 B2 * | 1/2007 | Perry et al. ................... 409/234 |
| 7,300,233 B2 * | 11/2007 | Haenle et al. .................. 408/57 |
| 2006/0029480 A1 * | 2/2006 | Stoll et al. ................... 409/136 |
| 2006/0029482 A1 * | 2/2006 | Stoll et al. ................... 409/136 |

FOREIGN PATENT DOCUMENTS

JP    2005161471 A  *  6/2005

* cited by examiner

*Primary Examiner* — Daniel Howell
*Assistant Examiner* — Paul M Janeski
(74) *Attorney, Agent, or Firm* — Burr & Brown

(57) ABSTRACT

An interface between a shank tool and a lubricant transfer area. The shank tool is arranged in a tool holder, and comprises a clamping section, a conical shank end and at least one internal lubricant duct comprising an orifice located in a tapered surface of the shank end outside a shank tool axis. The lubricant transfer area is provided in the tool holder, which encompasses an inner recess, and which narrows in the direction of a centrical lubricant feed pipe, the inner recess defining an inner cone supporting the conical shank end radially outside of the orifice. The conical shank end and the lubricant transfer area include a funnel-shaped lubricant transfer chamber, which extends between the centrical lubricant feed pipe and a tapered surface contact area between the inner cone of the lubricant transfer area and the conical shank end. Also, an adjustable screw for an interface as described above.

11 Claims, 2 Drawing Sheets

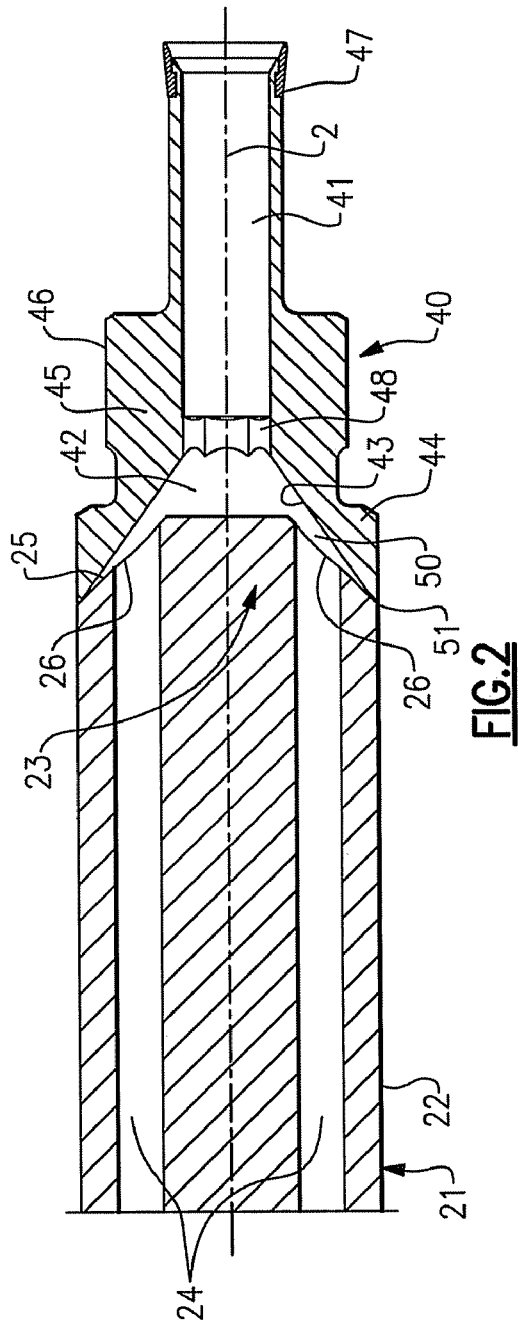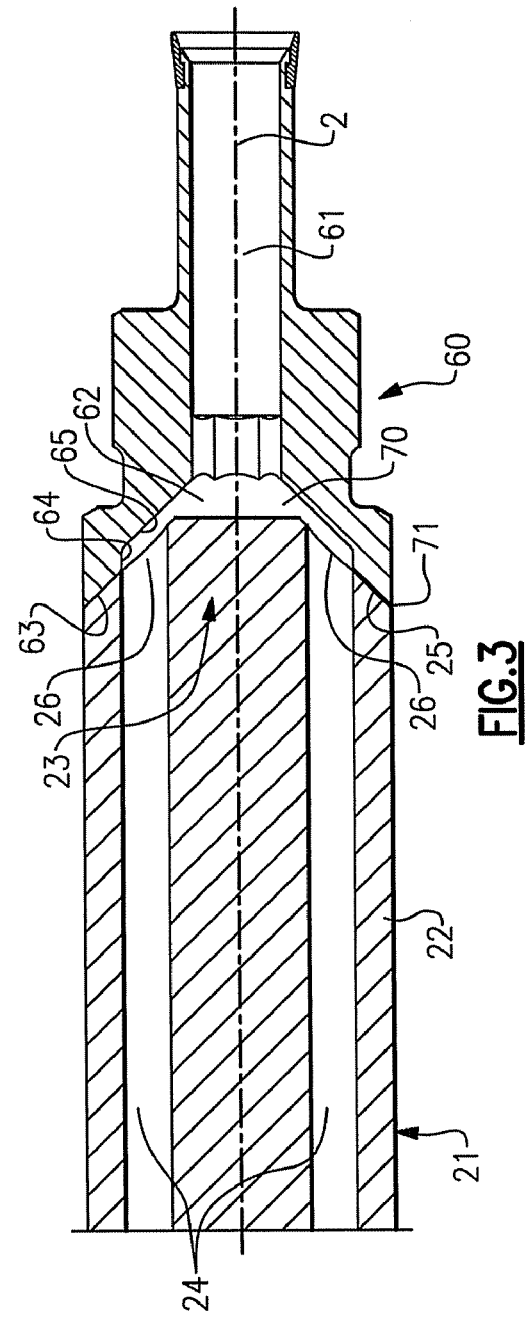

INTERFACE BETWEEN A ROTATING SHANK TOOL AND A LUBRICANT TRANSFER AREA IN A TOOL HOLDER

The invention relates to an interface, which is suitable for the MMS technology, between a shank tool accommodated in a tool holder and a lubricant transfer area provided in the tool holder according to the preamble of claim 1 as well as to an adjustable screw, which is suitable as a lubricant transfer area.

MMS technology, that is, the so-called small quantity and minimal quantity lubrication, respectively, is becoming more important in particular in machining technology. The focus is thereby on bringing a lubricant in the form of an aerosol comprising a minimal percentage of lubricant and a considerable excess of air to the cutting edges, which are engaged, in the most even consistency and quality as possible. Quality fluctuations, which are caused, e.g., in that cyclical or spontaneous demixing can take place in the aerosol, which is supplied under pressure, can lead to an unforeseeable tool breakage and, as a consequence, can lead to considerable damages due to interruptions in production. The tool breakage is thereby a result of the tool overload caused by high feed forces in combination with the friction-related thermal stress, which is to be reduced by means of the lubricant, in particular at the cutting edges of the tool. In response to an insufficient lubricant supply, said thermal stress, in addition to the stresses caused by the cutting forces in the tool, leads to stresses induced by temperature.

An interface according to the preamble of claim 1 is known from DE 202004021168 U1, for example. In this interface, a shank tool encompasses a cylindrical clamping shank comprises a conical shank end, which is accommodated in a positive fit in an inner cone of a connecting piece, which can be axially adjusted in the tool holder, comprises a centrical lubricant feed pipe, for the purpose of a support in axial direction. The shank end furthermore encompasses a slot, which is substantially oriented in radial direction, which comprises an orifice located in the tapered surface of the shank end of an interior lubricant duct, which is located so as to be offset to the shank axis. The lubricant feed from the centrical lubricant feed pipe into the at least one interior lubricant duct in the shank tool takes place via the slot, which is substantially oriented in radial direction. The tapered surfaces of the conical shank end of the shank tool and of the inner cone of the connecting piece are embodied as finely machined fitting areas, which closely abut on one another. Due to this tapered surface pairing, this interface can be easily sealed from the external surrounding so that an undesired lubricant escape, for example into a clamping area of the collet chuck, is avoided.

Based on an interface, as it is known from DE 202004021168 U1, the object on which the invention is based is to provide an MMS-suitable interface between a rotating shank tool and a lubricant feed area in a tool holder, which can be realized in a simple manner with regard to the manufacture thereof and which ensures a stable lubricant supply.

This object is solved by means of an interface comprising the features of claim 1 as well as by means of a suitable adjustable screw comprising the features of claim 9. Advantageous and preferred developments are the object of dependent claims.

The interface according to claim 1 of the instant invention differs from an interface as it is known from DE 202004021168 U1 in particular in that the conical shank end and the lubricant transfer area, which is provided on the tool holder side and which is preferably embodied as an adjustable screw, which is arranged in the tool holder so as to be capable of being adjusted, enclose a funnel-shaped lubricant transfer chamber (conical annular space), which extends between the centrical lubricant feed pipe and the tapered surface contact area between the conical shank end and the inner cone in the lubricant transfer area.

The funnel-shaped lubricant transfer chamber allows for a fluidically efficient transfer of the lubricant from the centrical lubricant feed pipe of the lubricant transfer area provided on the tool holder side into the at least one interior lubricant duct in the shank tool. The funnel shape ensures that the lubricant transfer chamber completely surrounds the tapered surface of the conical shank end in peripheral direction in the area located radially within the tapered surface contact area, that is, the area of the tapered surface of the conical shank end, in which the orifice(s) is(are) located. The design according to the invention makes it possible for the orifices to always be accessible without requiring a slot, which penetrates the conical shank end in radial direction, independent on the angular position of the shank tool relative to the lubricant transfer area with reference to a common longitudinal center axis as well as independent on whether all of the orifices are located on the same reference circle or whether one/several are located on smaller reference circles in the case of a plurality of orifices.

This design of the lubricant transfer chamber thus always provides for an unhindered lubricant access into the orifice(s) at the shank end in axial/radial direction as well as in peripheral direction, thus also ensuring a stable lubricant flow from the centrical lubricant feed pipe of the lubricant transfer area provided on the tool holder side into the orifice(s) at the shank end. Contrary to the afore-discussed known interface, a radially oriented slot, which encloses the orifice, is thus no longer necessary at the shank end, whereby the production of the conical shank end is simplified. Due to a corresponding dimensioning and toleration of the volume of the funnel-shaped lubricant transfer chamber, it is additionally possible to attain very high lubricant flow ratios. In particular, a corresponding toleration of the lubricant transfer chamber can make it possible that the lubricant supplied via the centrical lubricant feed pipe flows into the at least one interior lubricant duct in the shank tool via the funnel-shaped lubricant transfer chamber at substantially the same or a higher flow speed, than it flows into the lubricant transfer chamber through the centrical lubricant feed pipe. In the case of an aerosol-containing lubricant, a formation of a turbulence due to pressure pulsations caused by a sudden change of the flow speed and a demixing of the aerosol (lubricant/air) can thus be reduced considerably.

Independent on whether the contact area is realized in the form of a line contact extending in peripheral direction or in the form of a surface contact, the tapered surface contact area embodied radially outside of the orifice(s) between the outer cone formed by the tapered surface at the shank end and the inner cone in the lubricant transfer area makes it possible to provide for a reliable sealing of the interface from the tool holder, which can be produced in a simple manner. The tapered surface at the conical shank end as well as the inner cone of the lubricant transfer area can be produced in a simple manner. For the purpose of sealing the interface, the outer cone and the inner cone are embodied as finely machined joining fit areas.

To avoid an excessive shortening of the length of the cylindrical clamping section of the tool shank as compared to the typically standardized entire length of the shank, the shank end is preferably not embodied as a cone but as a frustum. In any case, the tapered surface, which forms the shank end, is only interrupted by the orifice of the at least one interior lubricant duct.

The funnel-shaped lubricant transfer chamber extends in radial direction, preferably to the outside to such an extent that it is substantially flush with the orifice of the at least one lubricant duct. "Pockets" and "dead spots", respectively, radially outside of the orifice of the lubricant duct in which an interruption of the lubricant flow and thus a demixing of the lubricant could possibly take place, can thus be avoided for the most part by means of this development.

The longitudinal section profile and thus the change of the cross section surface of flow of the funnel-shaped lubricant transfer chamber in flow direction as well as the flow speed profile of the lubricant resulting from these parameters, can be defined from the outer contour of the conical shank end and from the inner contour of the inner recess of the lubricant transfer area provided on the tool holder side, which narrows in the direction of the centrical lubricant feed pipe.

In a preferred embodiment, the cone angle of the outer cone formed by the tapered surface of the shank end is greater than the cone angle of the inner cone of the lubricant transfer area provided on the tool holder side. In this case, a line contact results between the outer cone of the shank end and the inner cone of the lubricant transfer area provided on the tool holder side. Furthermore, the funnel-shaped lubricant transfer area narrows in this embodiment, when viewed in the axial longitudinal section, in the direction of the shank end. Dead spots radially outside of the orifice(s) at the shank end can thus be maintained to be small. The narrowing of the funnel-shaped lubricant transfer area, when viewed in the axial longitudinal section, in the direction of the shank end furthermore provides for an adaptation of the cross section surface of flow in lubricant flow direction, which allows for the increase of the diameter of the funnel-shaped lubricant transfer area in such a manner that the respective desired flow ratios result. The production of the interface furthermore proves to be particularly simple due to the fact that the inner cone of the lubricant transfer area provided on the tool holder side as well as the outer cone of the shank end is formed as pure tapered surfaces.

In a further preferred embodiment, the cone angle of the outer cone of the shank end corresponds to the cone angle of the inner cone of the lubricant transfer area provided on the tool holder side. This embodiment results in an area contact between the shank end and the lubricant transfer area provided on the tool holder side outside of the orifice(s) in radial direction and in a very high impermeability of the interface in response to a corresponding fine finishing of both of the tapered surface pairing. So as to ensure a lubricant flow into the orifice(s) in this embodiment, provision is made for the peak of the inner cone, which supports the outer cone of the shank end to open into a cylinder section having a defined length, which is eventually connected to the centrical lubricant feed pipe via a further inner cone, which narrows in the direction of the centrical lubricant feed pipe. Preferably, the further inner cone has the same cone angle as the inner cone, which supports the shank end, of the lubricant transfer area provided on the tool holder side. Due to the cylinder section, the required access of the lubricant to the orifice(s) at the shank end in this embodiment is thus always ensured. A corresponding dimensioning of the axial length of the cylinder section furthermore makes it possible for the funnel-shaped lubricant transfer chamber not to taper in lubricant flow direction, whereby a desired annular space volume can be attained up to the tapering of the lubricant transfer chamber in flow direction.

The at least one interior lubricant duct can be located continuously outside of the shank axis. It goes without saying that the invention is not limited to the use with only one lubricant duct. When only one lubricant duct is used, a centrical arrangement of the lubricant duct is possible, which then opens into an orifice, which is located outside of the shank axis (arranged eccentrically).

Preferably, the lubricant transfer area is embodied as an adjustable screw, which is arranged so as to be adjustable in axial direction in the tool holder. Advantageously, said adjustable screw has the shape of a staged cylinder, wherein the section with the greater diameter forms the inner recess and the section with the smaller diameter encompasses an external thread for a screw connection in a tapped bore in the tool holder. This shape is already known from the afore-discussed document and has proven itself.

The use of such an adjustable screw comprising an inner recess, which is separated into two inner cones by means of a cylinder section for the lubricant supply, is not limited to a shank tool comprising a conical shank end, but is also suitable, for example, for a shank tool comprising a radially oriented slot, as it is described in the afore-discussed document. For this reason, protection is sought for such an adjustable screw, independent on the interface according to the invention.

Preferably, the tool holder is a collet chuck, in particular a hydraulic expansion chuck. It goes without saying that other types of collet chucks, such as shrink collet chucks or multi-flange chucks, can also be used.

Preferred embodiments of the invention are illustrated in the drawing and will be defined in more detail below.

FIG. 2 shows the first embodiment of the interface according to the invention; and FIG. 3 shows a second embodiment of an interface according to the invention.

Figure 1:
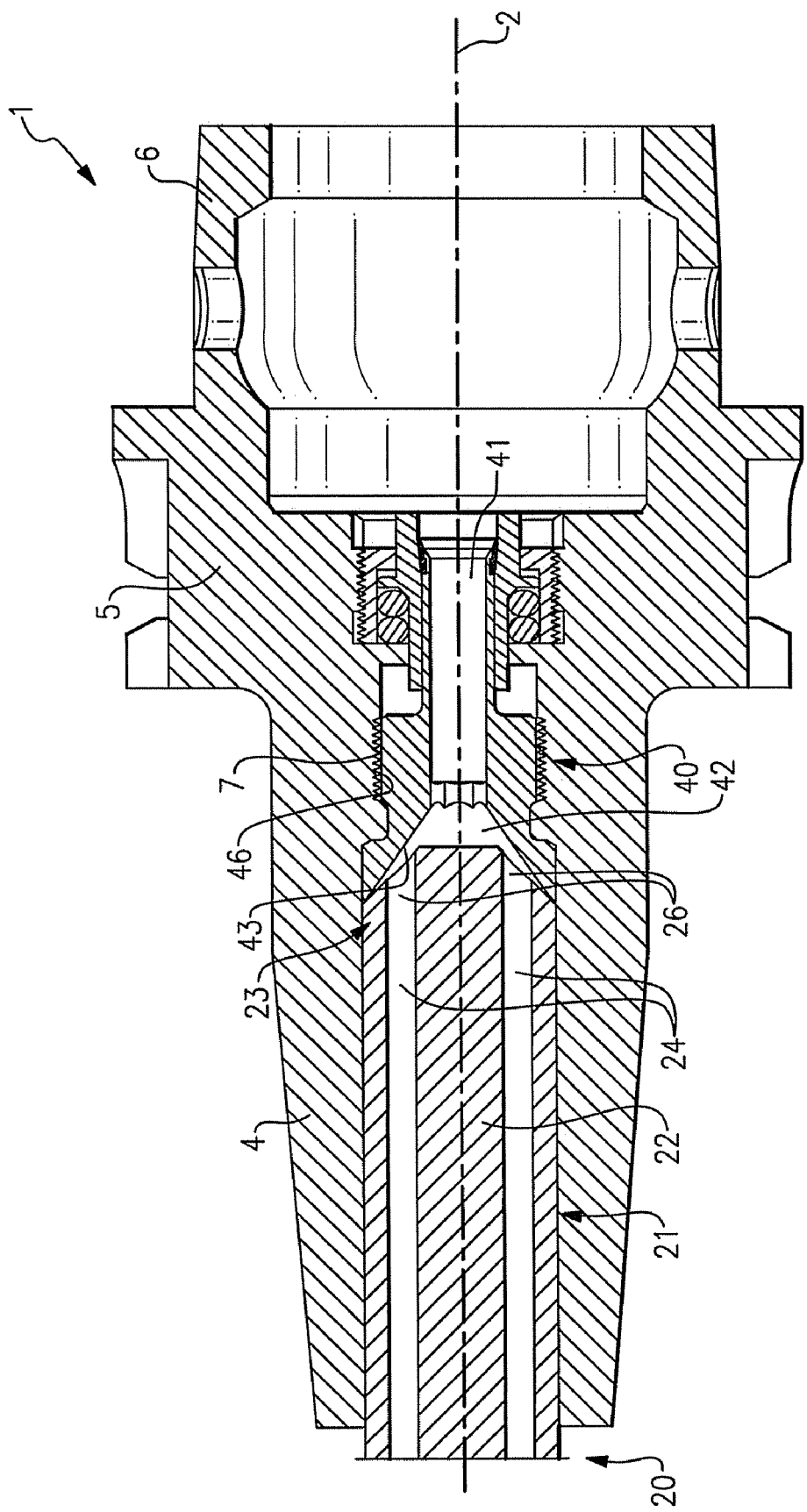
FIG. 1 shows an axial longitudinal section through a tool holder comprising a first embodiment of an interface according to the invention.

FIG. 1 shows an axial longitudinal section through a tool holder 1 in the form of a collet chuck (hydraulic expansion chuck), which comprises a clamping section 4, a center section 5 as well as a coupling section 6, which extend along a common longitudinal center axis 2. The clamping section 4 is provided for clamping a rotating shank tool 20, for example a drilling tool 20 (illustrated in a shortened manner in FIG. 1). Provision is made in the center section 5 for a lubricant transfer area in the form of an adjustable screw 40, which arranged so as to be adjustable in axial direction. The coupling of the collet chuck 1 to a clamping device, which is not illustrated in FIG. 1, of a machine tool, for example a drill, which is also not illustrated, takes place via the coupling section 6.

The shank tool 20 encompasses a machining section (not illustrated in FIG. 1) and a shank 21, which can be functionally divided into a cylindrical clamping section 22 and a conical shank end 23. The shank tool 20 is clamped in the clamping section 4 of the collet chuck 1 via the cylindrical clamping section 22. The conical shank end 23, which has the shape of a frustum, serves the purpose of tightly coupling the shank tool 20 to the adjustable screw 40, which is provided on the collet chuck side. For this purpose, the conical shank end 23 encompasses a tapered surface 25, which forms the outer cone. The conical shank end 23 thus differs from the bezel, which is present in common shank tools, in function as well as in surface quality.

As is shown in FIG. 2, the shank tool 20 furthermore encompasses two diametrically arranged lubricant ducts 24, which are located on the same reference circle and which end in each case in an orifice 26 located outside of the shank axis 2 in the tapered surface 25 of the shank end 23.

The lubricant, which is supplied on the machine tool side (from the right in FIG. 1), is fed into the lubricant ducts 24 of the shank tool 20 via the adjustable screw 40. For this purpose, the adjustable screw 40, viewed from right to left in FIG. 2, encompasses a centrical lubricant feed pipe 41, which opens into the peak of an inner recess 42, the diameter of which increases in the direction of the conical shank end 23. The inner recess 42 is formed by a tapered surface 43, which forms the inner cone.

To attain the tightest possible attachment of the tapered surface 25, which forms the outer, cone, of the conical shank end 23 at the inner cone 43 of the adjustable screw 40, the two tapered surfaces 25 of the shank end 23 and the inner cone 43, are machined as finely as possible, that is, to a joining fit, at least in the contact area, which is located outside of the orifice 26 in radial direction when viewed in axial direction.

As is illustrated in FIG. 1 and FIG. 2, the shank tool 20 is supported with its conical shank end 23 on the inner cone 43 of the adjustable screw 40 in the area radially outside of the orifices 26. The invention relates in particular to the design of the interface between the conical shank end 23 of the shank tool 20 and to the adjustable screw 40, which is arranged in the collet chuck 1. The interface according to the invention is in particular characterized in that the conical shank end 23 and the inner cone 43 enclose a funnel-shaped lubricant transfer chamber 50, which extends between the centrical lubricant feed pipe 41 and the tapered surface contact area 51 between the conical shank end 23 and the inner cone 43 of the adjustable screw 40.

In the first embodiment, the cone angle of the outer cone 25 of the shank end 23 (measured opposite to the shank axis 2) is greater than the cone angle of the inner cone 43 of the adjustable screw 40, thus resulting in a line contact between the outer cone 25 of the shank end 23 and the inner cone 43 of the adjustable screw 40. A reliable sealing of the interface takes place by means of a corresponding fine finishing of the outer cone 25 of the shank end 23 and of the inner cone 43 at least in the area of the tapered surface contact area 51, that is, in the area radially outside of the orifices 26. Due to this design, the funnel-shaped lubricant transfer chamber 50 narrows, when viewed in the axial longitudinal section, in the direction of the conical shank end 23 and in flow direction of the lubricant, respectively. In FIG. 1, the funnel-shaped lubricant transfer chamber 50 extends in radial direction slightly beyond the orifices 26. Ideally, the funnel-shaped lubricant transfer chamber 50 is substantially flush with the orifices 26 in radial direction.

The lubricant transfer chamber 50 allows for a fluidically efficient transfer of the lubricant from the centrical lubricant feed pipe 41 into the lubricant ducts 24 of the shank tool 20. The funnel shape completely surrounds the tapered surface 25 of the shank end 23 in peripheral direction in the area radially within the tapered surface contact area 51, that is, in the area in which the orifices 26 are located. This design makes it possible for the orifices 26 to always be accessible without requiring a slot, which penetrates the conical shank end 23 in radial direction, independent on the angular position of the shank tool 20 relative to the adjustable screw 40 about the shank axis 2. Furthermore, a corresponding dimensioning and toleration, respectively, of the cone angles of the outer cone 25 of the conical shank end 23 and of the inner cone 43 of the adjustable screw 40 makes it possible for the axial flow speed profile to be optimized in such a manner that the lubricant flows from the centrical lubricant feed pipe 41 into the lubricant ducts 24 at an approximately constant flow speed.

Due to the funnel shape of the lubricant transfer chamber 50, a flow profile of the lubricant, which acts upon the entire funnel-shaped lubricant transfer chamber 50, will form at least under the influence of the centrifugal forces, which occur during the operation of the tool. A suitable definition of the cross section surface of the ring of the funnel-shaped lubricant transfer chamber 50, that is, the cross section surface of flow, allows for a continuous lubricant flow from the centrical lubricant feed pipe 41 into the lubricant ducts 26 to be realized. In other words, a suitable definition of the volume of the funnel-shaped lubricant transfer chamber 50, allows for an adaptation/approximation, for example, of the flow speed to be realized in the area of the centrical lubricant feed pipe 41 and in the area of the lubricant ducts 26. On the other hand, a corresponding dimensioning of the volume of the funnel-shaped lubricant transfer chamber 50 can also allow for a flow speed of the lubricant flowing into the lubricant ducts 26 to be different from the flow speed of the lubricant flow in the centrical lubricant feed pipe 41. More precisely, in the case in which the entire cross section surface of flow of the lubricant ducts 26 is smaller than the cross section surface of flow of the centrical lubricant feed pipe 41, the lubricant will flow faster through the two lubricant ducts 26 than through the centrical lubricant feed pipe 41 for fluidic reasons, as long as a flow balance prevails in the entire system. In any case, pressure pulsations, which can lead to an irregular lubricant supply to the (non-illustrated) machining section of the shank tool 20 on the one hand and to a demixing of an aerosol lubricant on the other hand, can be avoided or can be kept low.

Test runs have shown that the subsequent supply of the machining section of the shank tool 20 comprising lubricant runs without problems after a short start-up phase, in which the lubricant transfer chamber 50 has filled with lubricant. Demixing, brief interruptions of the lubricant supply or fluctuations in the supply quantity can be avoided, as mentioned above, by means of a suitable dimensioning and toleration of the geometric parameters, which define the lubricant transfer chamber 50.

As is illustrated in FIG. 2, the adjustable screw 40 has the shape of a staged cylinder. The inner recess 42 is embodied in a section 44 with a larger diameter, while an external thread 46 serves the purpose of a screw connection in a tapped bore 7 of the collet chuck 1 in the section 45 with a smaller diameter. Furthermore, the adjustable screw 40 encompasses a hexagon socket 48, via which the adjustable screw 40 can be adjusted in axial direction in the collet chuck 1 by means of a suitable tool. Furthermore, FIG. 2 shows a pipe-like extension 47 of the adjustable screw 40, which serves the purpose of a connection with a (non-illustrated) lubricant transfer pipe, which is provided on the machine tool side.

FIG. 3 shows a second embodiment of the interface according to the invention. The second embodiment differs from the first embodiment only in the design of the adjustable screw 60 and of the inner recess 62, which accommodates the conical shank end 23 of the shank tool 20.

In the second embodiment, the inner recess 62 of the adjustable screw 60 is formed by two inner cones 63 and 65, which are connected to one another by means of a cylinder section 64 having a predefined length. The radially inner inner cone 65 opens in its peak area into the centrical lubricant feed pipe 61, while the radially outer inner cone 63 abuts closely on the outer cone 25 of the shank end 23.

As in the first embodiment, the interface according to the second embodiment is also characterized in that the conical shank end 23 and the radially inner inner cone 65b of the adjusting screw 60 include a funnel-shaped lubricant transfer chamber 50, which extends between the centrical lubricant feed pipe 61 and the tapered surface contact area 71 between the conical shank end 23 and the radially outer inner cone 63 of the adjusting screw 60. Furthermore, as is the case in the first embodiment, the shank tool 20 with its conical shank end 23 is supported on the adjusting screw 60 in an area radially outside of the orifices 26.

However, contrary to the first embodiment, the radially outer inner cone 63 as well as the radially inner inner cone 65 has the same cone angle as the outer cone 25 of the conical shank end 23. Contrary to the first embodiment, the surface of the outer cone 25 of the shank end 23 and the surface of the inner cone 63 of the adjusting screw 60 thus come into contact. In terms of the best possible sealing of the interface, the tapered surfaces forming the outer cone 25 and the inner cone 63 are thus also as machined as finely as possible, that is, to a joining fit.

In the second embodiment, the axial length of the cylinder section 64 determines the cross section surface of flow of the funnel-shaped lubricant transfer chamber 70. Good flow ratios similar as in the first embodiment can thus be attained by correspondingly adapting the length of the cylinder section 64.

In FIG. 3, the funnel-shaped lubricant transfer chamber 70 extends outwards in radial direction substantially to the extent that it ends so as to be flush with the orifices 26.

The invention claimed is:

1. An interface between
    a shank tool arranged in a tool holder, the shank tool comprising a machining section, a shank comprising a cylindrical clamping section and a conical shank end on the side facing away from the machining section and at least one internal lubricant duct comprising an orifice, the orifice located in the tapered surface of the shank end outside of the shank axis and
    a lubricant transfer area provided in the tool holder, the lubricant transfer area comprising an inner recess, the inner recess narrowing in the direction of a centrical lubricant feed pipe, said inner recess defining an inner cone, the inner cone supporting the conical shank end radially outside of the orifice, characterized in that
    the conical shank end and the lubricant transfer area including a funnel-shaped lubricant transfer chamber, the funnel-shaped lubricant transfer chamber extending between the centrical lubricant feed pipe and a tapered surface contact area between the inner cone of the lubricant transfer area and the conical shank end.

2. The interface according to claim 1, wherein
    the cone angle of the conical shank end is greater than the cone angle of the inner cone of the lubricant transfer area and
    the inner cone opens in its peak into the centrical lubricant feed pipe.

3. The interface according to claim 1, wherein
    the cone angle of the conical shank end is as large as the cone angle of the inner cone of the lubricant transfer area,
    the inner cone opens in its peak into a cylinder section having a defined length and
    the cylinder section is connected to the centrical lubricant feed pipe via a further inner cone, which narrows in the direction of the centrical lubricant feed pipe.

4. The interface according to claim 1, wherein the lubricant transfer chamber extends outward in radial direction to the extent that it substantially ends so as to be flush with the orifice of the at least one lubricant duct.

5. The interface according to claim 1, wherein
    the lubricant transfer area is embodied as an adjustable screw, which is arranged in the tool holder so as to be capable of being adjusted.

6. The interface according to claim 5, wherein
    the adjustable screw substantially has the shape of a staged cylinder,
    a section with a greater diameter than a diameter of the adjustable screw forms the inner recess and
    a section with a smaller diameter than the diameter of the adjustable screw encompasses an external thread for the purpose of a screw connection in a tapped bore in the tool holder.

7. The interface according to claim 1, wherein the tool holder is a collet chuck, preferably a hydraulic collet chuck.

8. The interface according to claim 1, wherein the cross section surface of flow of the funnel-shaped lubricant transfer chamber is tolerated in such a manner in the area of the orifice of the at least one lubricant duct that the result is a lubricant transfer from the centrical lubricant duct into the at least one interior lubricant duct at a substantially constant flow speed.

9. The interface according to claim 1, wherein the conical shank end has the shape of a frustrum.

10. An adjustable screw to be used as lubricant transfer area in an interface according to claim 1 comprising an inner recess, which is embodied so as to be concentric with reference to the axis of the screw and which opens into a centrical lubricant feed pipe, wherein
    the inner recess encompasses an inner cone for the purpose of supporting the conical shank end, the peak of which opens into a cylinder section having a defined length and
    the cylinder section is connected to the centrical lubricant feed pipe via a further inner cone, which narrows in the direction of the centrical lubricant feed pipe.

11. The interface according to claim 10, wherein the adjustable screw substantially has the shape of a staged cylinder, the section with the larger diameter forming the inner recess and the section with the smaller diameter encompassing an external thread for the purpose of a screw connection in a tapped bore in the tool holder.

* * * * *